US010423959B2

(12) United States Patent
Douglas et al.

(10) Patent No.: US 10,423,959 B2
(45) Date of Patent: Sep. 24, 2019

(54) VOICE RECOGNITION TO AUTHENTICATE A MOBILE PAYMENT (71) Applicant: CAPITAL ONE FINANCIAL CORPORATION, McLean, VA (US)

(72) Inventors: Lawrence Douglas, McLean, VA (US); Paul Y. Moreton, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/845,108

(22) Filed: Dec. 18, 2017

(65) Prior Publication Data
US 2018/0121927 A1 May 3, 2018

Related U.S. Application Data (63) Continuation of application No. 14/592,724, filed on Jan. 8, 2015, now Pat. No. 10,192,219.

(60) Provisional application No. 61/925,281, filed on Jan. 9, 2014.

(51) Int. Cl.
G06Q 20/40 (2012.01)
G06Q 20/36 (2012.01)
G06Q 20/32 (2012.01)
G06Q 20/20 (2012.01)
G06Q 20/02 (2012.01)

(52) U.S. Cl.
CPC ....... G06Q 20/40145 (2013.01); G06Q 20/02 (2013.01); G06Q 20/20 (2013.01); G06Q 20/327 (2013.01); G06Q 20/3224 (2013.01); G06Q 20/36 (2013.01); G06Q 20/4012 (2013.01)

(58) Field of Classification Search
CPC .......................... G06Q 20/3224; G06Q 20/02
USPC .......................................................... 705/16
See application file for complete search history.

(56) References Cited

U.S. PATENT DOCUMENTS

| 2005/0096906 | A1* | 5/2005 | Barzilay | G06Q 30/06 704/249 |
| 2009/0319274 | A1 | 12/2009 | Gross | |
| 2012/0284180 | A1* | 11/2012 | Yang | G06Q 20/12 705/41 |
| 2013/0205370 | A1* | 8/2013 | Kalgi | H04W 12/10 726/3 |

(Continued)

Primary Examiner — A. Hunter Wilder
Assistant Examiner — Joseph M Mutschler
(74) Attorney, Agent, or Firm — Finnegan, Henderson, Farabow, Garrett & Dunner, LLP (57) ABSTRACT Systems and methods are provided for authenticating mobile payments from a customer account to a merchant. The systems and methods may include a financial service provider receiving a request to authorize an electronic transaction at a point-of-sale. A financial service provider server computer may verify that the customer is present at the point-of-sale using received location data. An image having distorted text such as a captcha may be transmitted to a device at the point-of-sale, and the customer may read the captcha aloud. A voice sample of the customer may be sent to the financial service provider for comparison to stored voice recordings, to verify that the customer's voice sample is authentic if the voice matches a previously generated voice recording for the account. If the voice sample is authentic, the financial service provider may authorize the mobile payment.

20 Claims, 8 Drawing Sheets (56) References Cited

U.S. PATENT DOCUMENTS

2013/0339240 A1\* 12/2013 Anderson ............. G06Q 20/40
705/44
2015/0127536 A1\* 5/2015 Van Den Broeck ........................
G06Q 20/3224
705/44

\* cited by examiner

VOICE RECOGNITION TO AUTHENTICATE A MOBILE PAYMENT

CROSS-REFERENCE TO RELATED APPLICATIONS

This application is a continuation application of U.S. application Ser. No. 14/592,724, filed Jan. 8, 2015, which claims the benefit of priority from U.S. Provisional Application No. 61/925,281 filed Jan. 9, 2014, the disclosures of which are expressly incorporated herein by reference in their entirety.

BACKGROUND

Electronic payment methods are gaining popularity as an alternative to cash and credit cards. Mobile devices, such as smartphones, can store and transmit information necessary for electronic payments without the need for physical cards or currency that are easily misplaced or stolen. A mobile device can potentially store information for many payment accounts in a "digital wallet." Slowly but surely, digital wallets are becoming alternatives to cash and card-filled physical wallets.

Many merchants now accept electronic payments at the point-of-sale. Most point-of-sale electronic payment systems use a near field communication (NFC) chip, which is a short-range communication device that transfers a customer's account information wirelessly from the customer's mobile device digital wallet to a merchant computer. Other point-of-sale systems use a third party intermediary, such as PayPal™, to conduct electronic transactions between a customer and merchant.

Despite their growing popularity, mobile electronic payments raise many new concerns. At the forefront of these concerns is security: customers and their financial institutions need to ensure that electronic payments are authentic and properly authorized. Furthermore, the risk of identity theft increases when account information is transmitted wirelessly and subject to interception. To address these concerns, authentication steps are required at the point-of-sale.

Current authentication systems require the customer to perform many cumbersome steps at the point-of-sale, such as taking pictures of barcodes, and typing usernames, passwords, and PINS. Customers often are forced to complete these tasks while other customers are waiting in line. The complexity and inconvenience of these systems discourage customers from using electronic payments.

In view of these authentication concerns, and the shortcomings of current systems, a convenient and reliable way to authenticate mobile electronic payments is desired.

SUMMARY

Disclosed embodiments provide methods and systems for using voice recognition to authenticate mobile payments.

Consistent with a disclosed embodiment, a system for authenticating an electronic payment at a point-of-sale is provided. The system may include a storage device configured to store instructions and a processor configured to execute the instructions in the storage device. When the instructions are executed, the stored instructions may configure the processor to receive a request to conduct an electronic payment, transmit an image to the point-of-sale, receive a voice sample recorded at the point-of-sale, compare the received voice sample to one or more reference recordings, determine whether the voice sample is authentic when a speaker in the voice sample is determined to be the speaker in the one or more reference recordings; and authorize the electronic payment when the voice sample is determined to be authentic.

Consistent with another disclosed embodiment, a computer-implemented method for authenticating an electronic payment at a point-of-sale is disclosed. The method may comprise receiving a request to conduct an electronic payment, transmitting an image to the point-of-sale, receiving a voice sample recorded at the point-of-sale, comparing, by the one or more processors, the received voice sample to one or more reference recordings, determining whether the voice sample is authentic when a speaker in the voice sample is determined to be the speaker in the one or more reference recordings, and authorizing, by the one or more processors, the electronic payment when the voice sample is determined to be authentic.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to systems and methods for authenticating mobile payments using voice recognition. A computer-executed software application ("app"), such as an electronic payment app, may be provided by a financial service provider ("FSP"), which may execute financial transactions such as electronic payments for a customer of the FSP. The FSP may be a bank, credit card company, or other entity which handles financial transactions for individuals. The electronic payment app may be a standalone software application for a personal computing device, such as personal computer software or a mobile device app, or part of another software application provided by the FSP for managing finances related to banking, checking credit cards, debit cards, and/or loans.

A customer in a merchant store may initiate an electronic payment to purchase goods using his or her mobile phone. Electronic payments may be initiated using an electronic payment app executed by the mobile device, or using near field communication with a merchant computer. Upon initiating the electronic payment, a server computer operated by the FSP may receive a request to conduct an electronic transaction from the customer's mobile device or the merchant computer. The embodiments disclosed herein may be used to authenticate mobile payments (i.e., transfers of money from a customer to a merchant), or other electronic transactions, such as refunds. For discussion purposes, the terms "payment" and "transaction" are used interchangeably.

To complete the transaction, the FSP may request additional information. For example, the FSP may request data to determine the location of the individual requesting the electronic payment, such GPS location data of the mobile device that initiated the electronic transaction. The FSP may also request data to identify the individual such as a recording of the customer's voice.

The FSP may then process the received data, to verify that the individual is located at the point-of-sale, and that the transaction was not fraudulently initiated from a remote location. The FSP may also analyze the received voice data to ensure that the individual at the point-of-sale is in fact the FSP customer. If the location and identity are verified, the FSP may determine that the electronic transaction is authentic, and process the mobile payment.

Embodiments of the mobile payment authentication system and method described herein are designed to allow for swift and easy authentication, with easily understandable steps that a customer could comfortably perform even in a crowded store. Furthermore, specialized hardware such as an NFC chip is not required, and most current mobile devices are capable of conducting secure electronic transactions using the disclosed methods.

Voice Recognition Authentication System Components and Configuration

Figure 1:
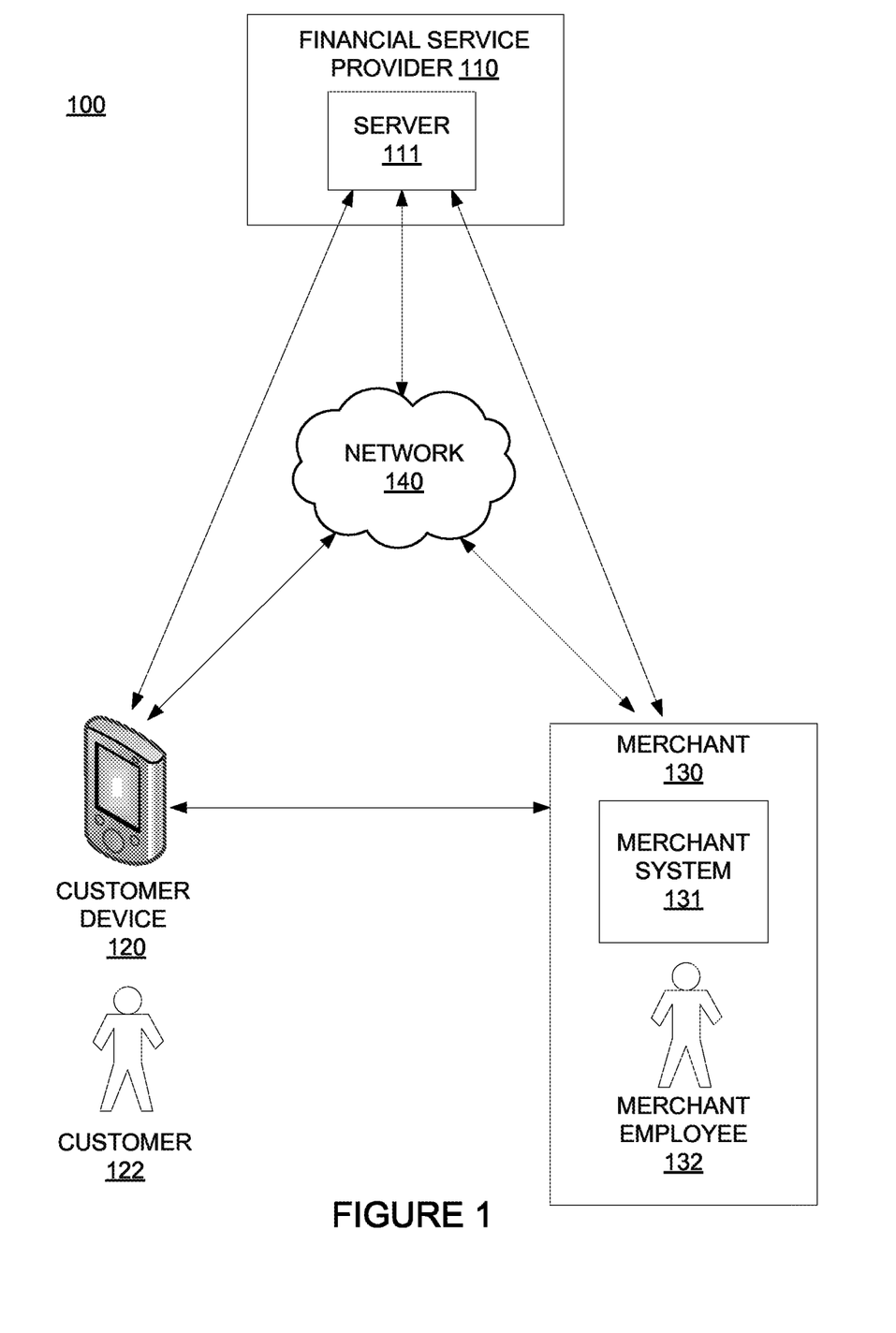
FIG. 1 is a diagram of an exemplary system that may be used to authenticate mobile electronic transactions, consistent with disclosed embodiments.

FIG. 1 shows a diagram of an exemplary mobile payment authentication system 100 that may be configured to perform one or more software processes that, when executed by one or more processors, authenticate mobile electronic payments using voice recognition, consistent with disclosed embodiments. The components and arrangements shown in FIG. 1 are not intended to limit the disclosed embodiments, as the components used to implement the disclosed processes and features may vary.

In accordance with disclosed embodiments, mobile payment authentication system 100 may include a financial service provider ("FSP") 110, one or more server(s) 111, at least one customer device 120, and one or more merchant(s) 130 having merchant system(s) 131, each communicating through network 140. Customer device 120 may be connected to FSP 110 via server 111 and to merchant 130 via merchant system 131, directly or via network 140. Server 111 may be connected to merchant system 131 directly or via network 140. Other components known to one of ordinary skill in the art may be included in mobile payment authentication system 100 to gather, process, transmit, provide, and receive information consistent with the disclosed embodiments.

Customer device 120 may allow one or more FSP 110 customers, such as customer 122, to electronically transfer funds from their FSP 110 account to an account associated with merchant 130. Customer device 120 may be a personal computing device such as, for example, a general purpose or notebook computer, a mobile device with computing ability, a tablet, smartphone, wearable device such as Google Glass™ or smart watches, or any combination of these computers and/or affiliated components. In one embodiment, customer device 120 may be a computer system or mobile computer device that is operated by customer 122 who is a FSP 110 customer.

Customer device 120 may be configured with storage that stores one or more operating systems that perform known operating system functions when executed by one or more processors. By way of example, the operating systems may include Microsoft Windows$^{SM}$, Unix™, Linux™, Apple™ Computers type operating systems, Personal Digital Assistant (PDA) type operating systems, such as Microsoft CE™, or other types of operating systems. Accordingly, disclosed embodiments may operate and function with computer systems running any type of operating system. Customer device 120 may also include communication software that, when executed by a processor, provides communications with network 140, such as Web browser software, tablet or smart hand held device networking software, etc.

FSP 110 may be a bank, credit card company, merchant, lender, and the like, offering financial services to customers. FSP 110 may operate one or more server(s) 111. Server 111 may be a computer-based system including computer system components, desktop computers, workstations, tablets, hand held computing devices, memory devices, and/or internal network(s) connecting the components.

Merchant 130 may be a retail or wholesale seller of goods or services. In some embodiments, merchant 130 may operate one or more brick-and-mortar stores that individuals (such as customer 122) can visit to purchase goods or services. Merchant 130 may operate merchant system 131. Merchant system 131 may include a computer system for handling tasks and data processing related to the operation of the merchant 130 stores. For example, merchant system 131 may send and receive data via network 140 to conduct financial transactions, such as credit and debit card charges, or mobile payments from digital wallets. Merchant system 131 may also communicate directly with FSP server 111 and/or customer device 120 to send and receive information necessary for performing steps of mobile payment authentication methods described herein. Merchant employee 132 may operate one or more components of merchant system 131, to perform functions related to selling services or products for merchant 130, such as collecting payments, issuing refunds, and any related functions.

Network 140 may comprise any type of computer networking arrangement used to exchange data. For example, network 140 may be the Internet, a private data network, virtual private network using a public network, and/or other suitable connection(s) that enables system 100 to send and receive information between the components of system 100. Network 140 may also include a public switched telephone network ("PSTN") and/or a wireless network.

Figure 2:
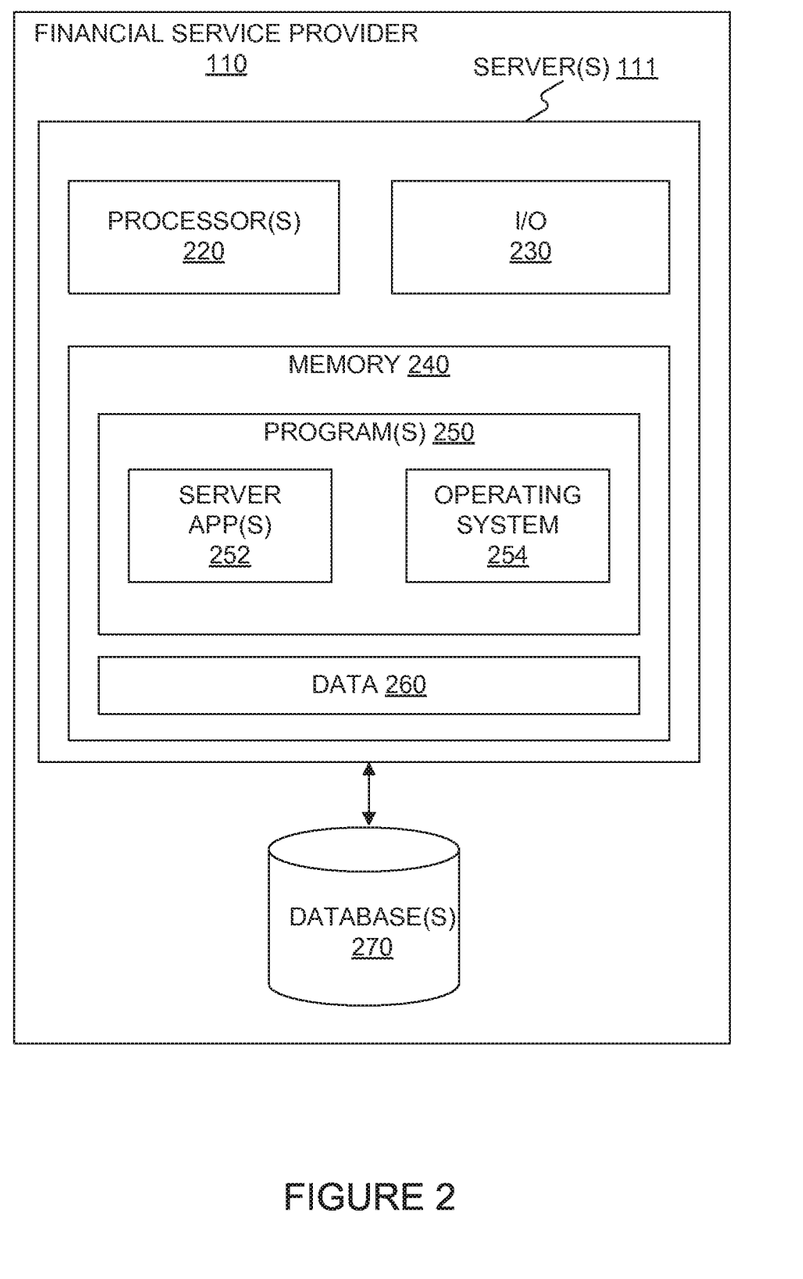
FIG. 2 is a diagram of an exemplary financial service provider.

FIG. 2 shows a diagram of system FSP 110, consistent with disclosed embodiments. As shown, financial service provider terminal 110 may include one or more server 111. Although discussed here in relation to FSP 110, it should be understood that variations of server 111 may be used by other components of system 100, including customer device 120 and merchant system 130.

Server 111 may include one or more processor 220, an input/output ("I/O") device 230, and memory 240 storing, for example, programs 250 and data 260. Server 111 may be a single server or may be configured as a distributed computer system including multiple servers or computers that interoperate to perform one or more of the processes and functionalities associated with the disclosed embodiments.

Processor 220 may be one or more known processing devices, such as a microprocessor from the Pentium™ family manufactured by Intel™ or the Turion™ family manufactured by AMD™. Processor 220 may constitute a single core or multiple core processors that executes parallel processes simultaneously. For example, processor 220 may be a single core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc. multiple software processes, applications, programs, etc. In another embodiment, processor 220 may include a multiple-core processor arrangement (e.g., dual, quad core, etc.) configured to provide parallel processing functionalities to allow server 111 to execute multiple processes simultaneously. One of ordinary skill in the art would understand that other types of processor arrangements could be implemented that provide for the capabilities disclosed herein.

FSP 110 may include one or more storage devices configured to store information used by processor 220 (or other components) to perform certain functions related to the disclosed embodiments. In one example, server 111 may include memory 240 that includes instructions to enable processor 220 to execute one or more applications, such as server applications, an electronic transaction application, network communication processes, and any other type of application or software known to be available on computer systems. Alternatively, the instructions, application programs, etc. may be stored in an external storage in direct communication with server 111, such as one or more database(s) 270 or available from a memory (not shown) over network 140. Database 270 or other external storage may be a volatile or non-volatile, magnetic, semiconductor, tape, optical, removable, non-removable, or other type of storage device or tangible (i.e., non-transitory) computer-readable medium.

In one embodiment, server 111 may include memory 240 that includes instructions that, when executed by processor 220, perform one or more processes consistent with the functionalities disclosed herein. Methods, systems, and articles of manufacture consistent with disclosed embodiments are not limited to separate programs or computers configured to perform dedicated tasks. For example, server 111 may include memory 240 that may include one or more programs 250 to perform one or more functions of the disclosed embodiments. Moreover, processor 220 may execute one or more programs located remotely from mobile payment authentication system 100. For example, server 111 may access one or more remote programs, that, when executed, perform functions related to disclosed embodiments.

Programs 250 stored in memory 240 and executed by processor(s) 220 may include one or more server app(s) 252 and operating system 254. Server app(s) 252 may incorporate one or more mobile payment apps that cause processor(s) 220 to execute one or more processes related to financial services provided to customers including, but not limited to, processing credit and debit card transactions, checking transactions, fund deposits and withdrawals, transferring money between financial accounts, lending loans, processing payments for credit card and loan accounts, and authenticating electronic payments initiated by customer device 120 or merchant system 130.

Memory 240 and database 270 may include one or more memory devices that store data and instructions used to perform one or more features of the disclosed embodiments. Memory 240 and database 270 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Sever 111 may also be communicatively connected to one or more remote memory devices (e.g., databases (not shown)) through network 140 or a different network. The remote memory devices may be configured to store information and may be accessed and/or managed by server 111. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Server 111 may also include one or more I/O devices 230 that may comprise one or more interfaces for receiving signals or input from devices and providing signals or output to one or more devices that allow data to be received and/or transmitted by server 111. For example, server 111 may include interface components, which may provide interfaces to one or more input devices, such as one or more keyboards, mouse devices, and the like, that enable server 111 to receive input from an employee of FSP 110 (not shown).

Figure 3:
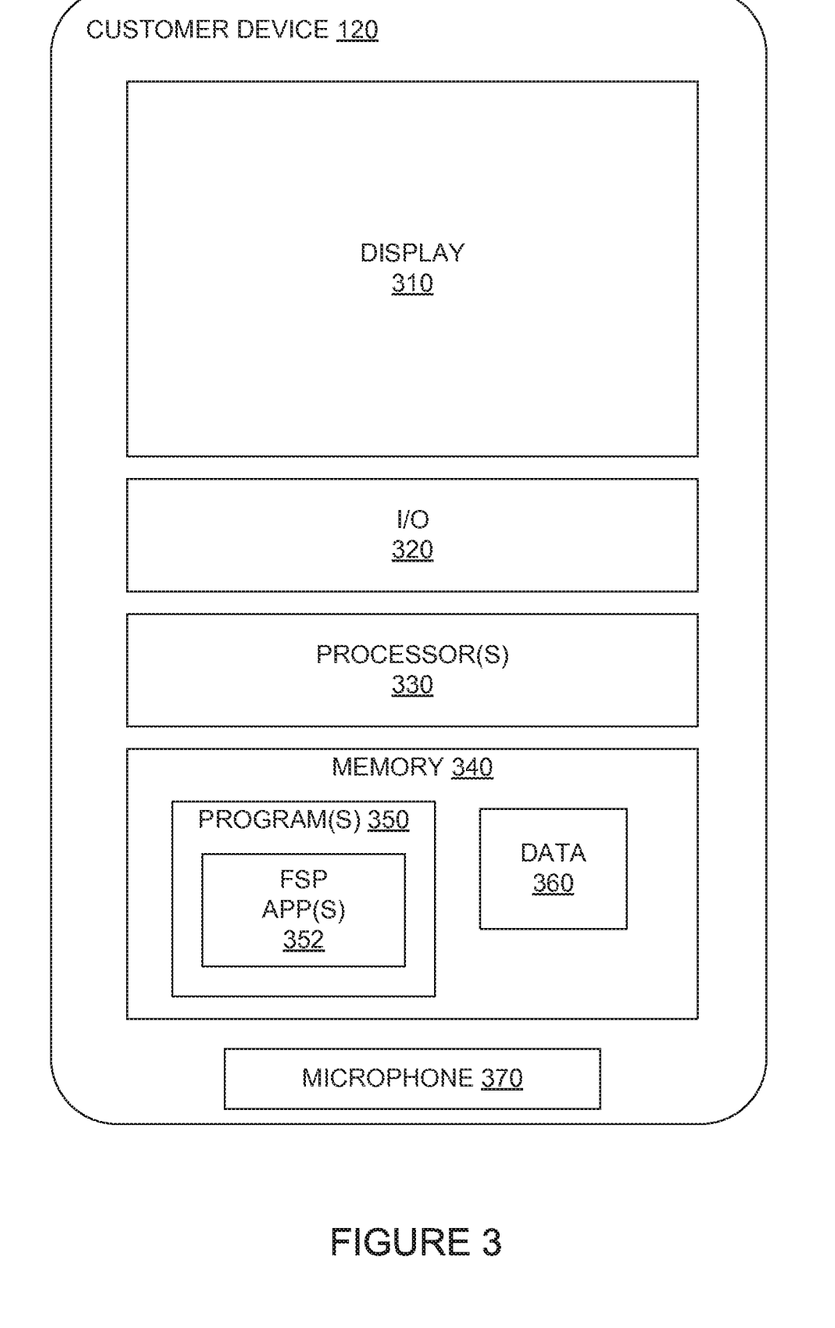
FIG. 3 is a diagram of an exemplary customer device.

FIG. 3 shows customer device 120, consistent with disclosed embodiments. As shown, customer device 120 may be configured with a display 310, input/output ("I/O") device(s) 320, one or more processor(s) 330, memory 340 storing one or more program(s) 350, such as FSP app(s) 352, data 360, and one or more microphone 370.

Display 310 may include one or more devices for displaying information, including but not limited to, liquid crystal displays (LCD), light emitting diode screens (LED), organic light emitting diode screens (OLED), and other known display devices.

I/O devices 320 may include one or more devices that allow customer device 120 to send and receive information. I/O devices 320 may include, for example, a keyboard, buttons, switches, or a touchscreen panel. I/O devices 320 may also include one or more communication modules (not shown) for sending and receiving information from other components in mobile payment authentication system 100 by, for example, establishing wired or wireless connectivity between customer device 120 to network 140, by establishing direct wired or wireless connections between customer device 120 and server 111, or between customer device 120 and merchant system 131. Direct connections may include, for example, Bluetooth™, Bluetooth LE™, WiFi, near field communications (NFC), or other known communication methods which provide a medium for transmitting data between separate devices.

Processor(s) 330 may be one or more known computing devices, such as those described with respect to processor 220 in FIG. 2.

Memory 340 may be a volatile or non-volatile, magnetic, semiconductor, tape, optical, removable, non-removable, or other type of storage device or tangible (i.e., non-transitory) computer-readable medium that stores one or more program(s) 350 and data 360. Data 360 may include, for example, customer 122's personal information, a reference recording of customer 122's voice, and FSP 110 account information. Data 360 may also include, for example, customer device 120 settings, transaction history data, image data, and any other data pertinent to the usage of customer device 120 and the performance of methods disclosed herein.

Program(s) 350 may include operating systems (not shown) that perform known operating system functions when executed by one or more processors. By way of example, the operating systems may include Microsoft Windows™ Unix™ Linux™, Apple™ operating systems, Personal Digital Assistant (FDA) type operating systems, such as Microsoft CE™, or other types of operating systems. Accordingly, disclosed embodiments may operate and function with computer systems running any type of operating system. Customer device 120 may also include communication software that, when executed by a processor, provides communications with network 140, such as Web browser software, tablet, or smart hand held device networking software, etc. Customer device 120 may be a device that executes mobile applications for performing operations consistent with disclosed embodiments, such as a tablet or mobile device.

Program(s) 350 may also include FSP app(s) 352, such as a mobile payment app. Similar to server app(s) 252 executed by FSP server 111, customer device 120 may execute one or more FSP app(s) 352 to perform processes related to initiating and authenticating electronic transactions such as mobile electronic payments: receiving, decrypting, and presenting images; recording, encrypting, and sending voice samples; comparing recorded voice samples to stored reference recordings; transmitting account information; and any other processes related to financial services, particularly processes related to the mobile payment authentication methods described herein.

Microphone 370 may include one or more devices for capturing sound data, such as for digitizing a voice, and for providing sound data to processor 330 for creating a voice recording.

Figure 4:
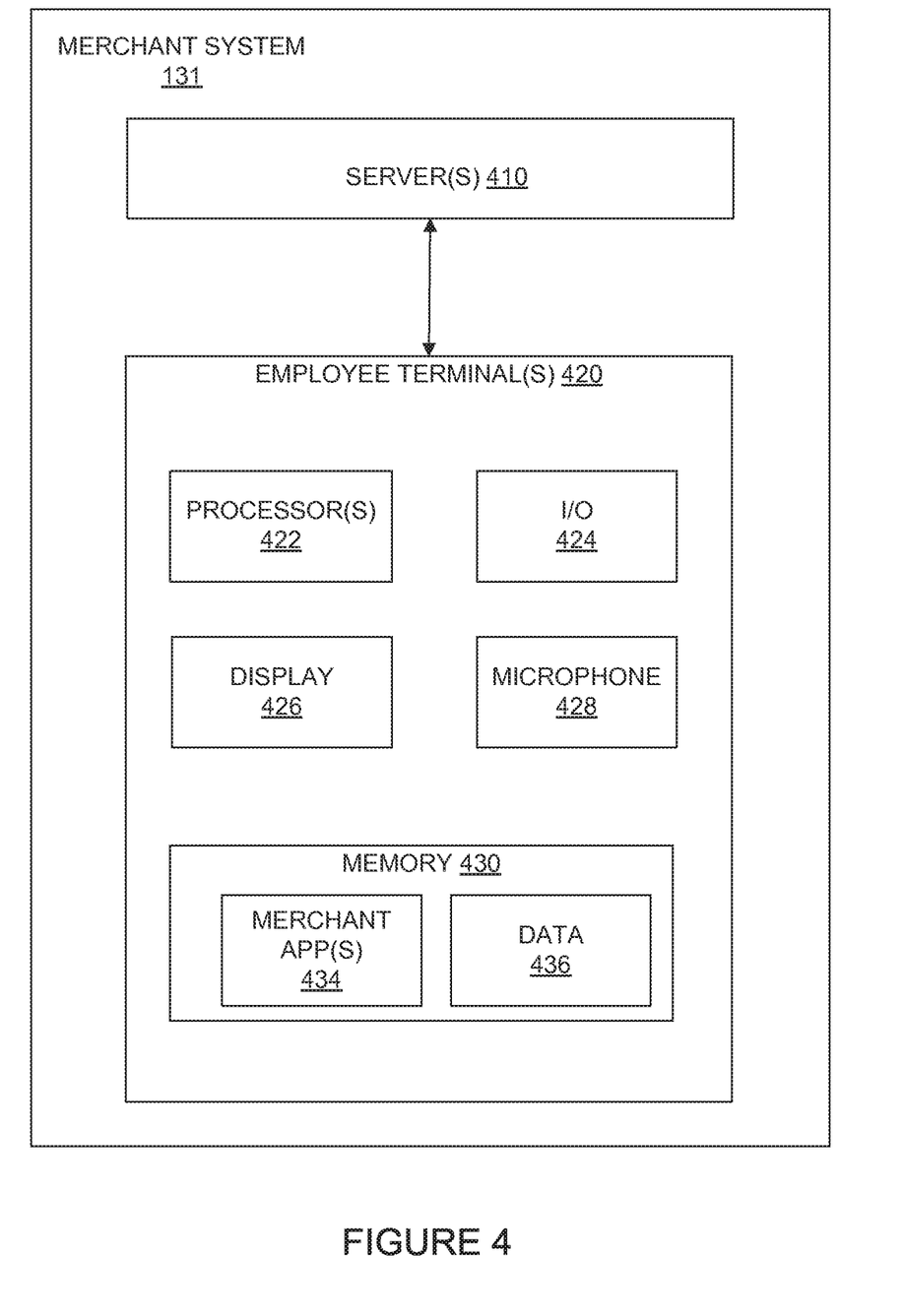
FIG. 4 is a diagram of an exemplary merchant system.

FIG. 4 shows a diagram of an exemplary merchant system 131, consistent with disclosed embodiments. As shown, merchant system 131 may include one or more server 410, and one or more employee terminal 420.

Server 410 may be a computer-based system including computer system components, desktop computers, workstations, tablets, hand held computing devices, memory devices, and/or internal network(s) connecting the components. Server 410 may have an architecture similar to FSP server 111 as described in connection with FIG. 2.

Employee terminal 420 may be a computer-based device in communication with server 410, operated by merchant employee 132 for conducting financial transactions with customer 122. For example, merchant employee 132 may operate employee terminal 420, to accept payments from a customer 122 purchasing goods or services. Employee terminal 420 may be a desktop computer, a workstation, or a hand held computing device.

As shown in FIG. 4, employee terminal 420 may include one or more processor 422, one or more I/O device(s) 424, a display 426, a microphone 428, and memory 430.

Processor 422 may be one or more known computing devices, such as those described with respect to processor 220 in FIG. 2.

I/O device(s) 424 may include one or more devices that allow employee terminal 420 to send and receive information. I/O device(s) 424 may also include communication modules (not shown) for sending and receiving information from other components in mobile payment authentication system 100 by, for example, connection to network 140 via server 410, and/or direct wired or wireless connection to one or more of customer device 120 or FSP server 111.

Display 426 may include one or more devices, such as LCD screens, for outputting information to merchant employee 132 and/or customer 122.

Microphone 428 may include one or more devices for capturing sound data, such as for digitizing a voice, and for providing sound data to processor 422 for creating a voice recording.

Memory 430 may be a volatile or non-volatile, magnetic, semiconductor, tape, optical, removable, non-removable, or other type of storage device or tangible (i.e., non-transitory) computer-readable medium that stores one or more programs such as merchant apps 434, and data 436.

Employee terminal 420 my execute one or more merchant apps 434, including a merchant version of a mobile payment app, to perform processes related to initiating and authenticating electronic transactions such as mobile electronic payments: receiving, decrypting, and presenting images; recording, encrypting, and sending voice samples; and any other processes related to financial services, particularly processes related to the mobile payment authentication methods described herein.

Data 436 may also include, for example, employee terminal 420 settings, transaction history data, image data, data identifying the merchant name and location, and any other data pertinent to the usage of employee terminal 420 and the performance of methods disclosed herein.

Voice Recognition Mobile Payment Authentication

Figure 5:
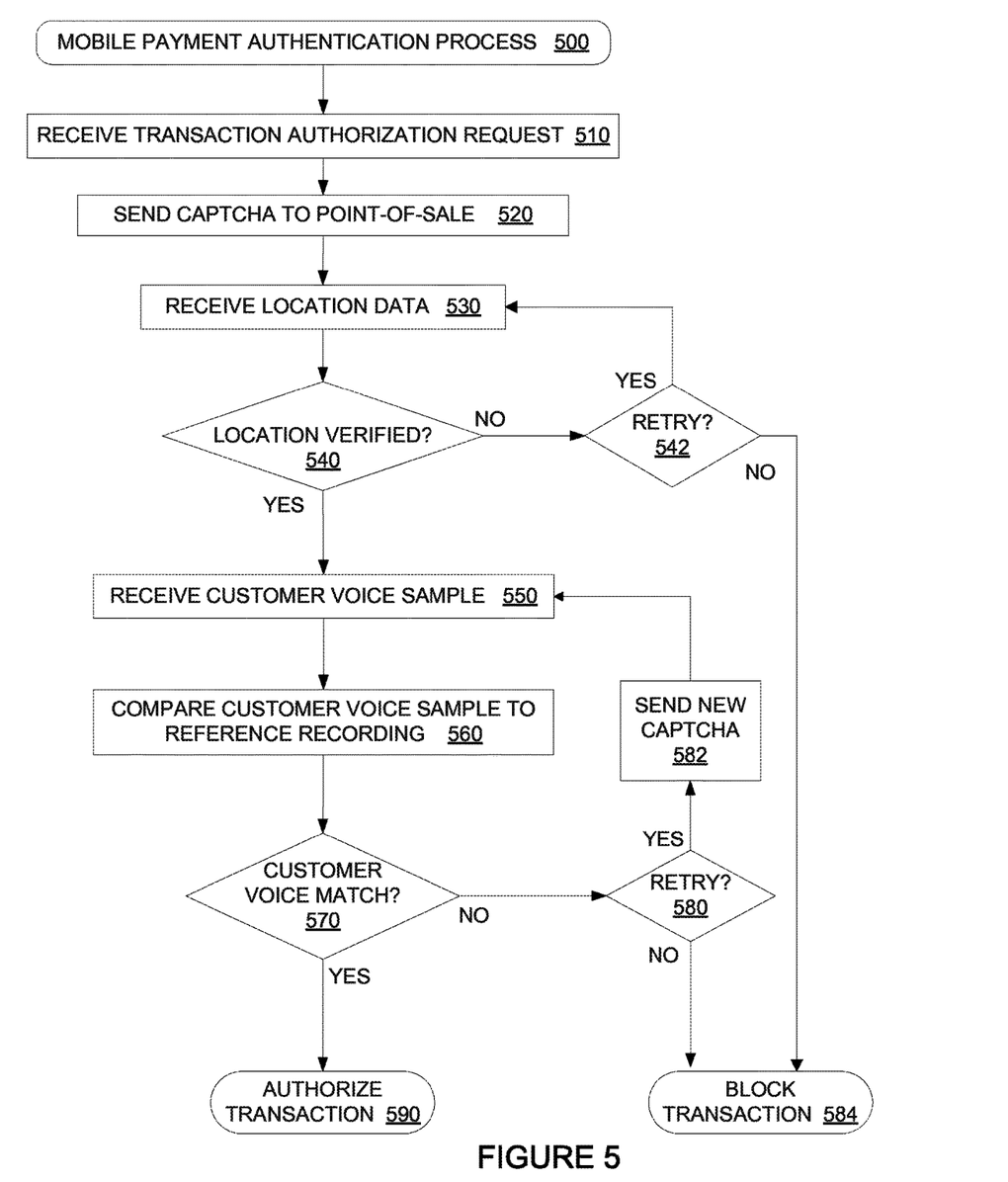
FIG. 5 is a flowchart of an exemplary method for authenticating a mobile payment, consistent with disclosed embodiments.

FIG. 5 shows a flowchart of an exemplary mobile payment authentication process 500. For discussion purposes, process 500 is described as performed by FSP server 111. In some embodiments, however, customer device 120 and/or merchant system 131 may perform one or more disclosed steps. In other embodiments, different components of shared expense system 100 (such as FSP server 111, employee terminal 420, and customer device 120) may perform various steps of the methods in a distributed-computing configuration.

Mobile payment authentication process 500 begins in step 510, when FSP 110 receives a request to authorize an electronic transaction, such as an electronic mobile payment. The request may be received from customer 122 using customer device 120. In some embodiments, the request may be received from merchant system 130 upon initiating an electronic transaction with customer 122 via customer device 120.

In step 520, FSP server 111 may transmit an image of distorted text, such as a Completely Automated Public Turing test to tell Computers and Humans Apart ("captcha"), to customer device 120. Customer device 120 may display the received captcha, with instructions for customer 122 to read the characters in the captcha aloud (step not shown). In some embodiments, FSP server 111 may send the captcha to merchant system 131, for display on an employee terminal 420 display 426.

FSP server 111 may receive location data in step 530. Location data may include, for example, GPS data, cellular triangulation data, or data for other known mobile device location methods. FSP server 111 may request and receive location data for customer device 120, merchant system 131, and/or employee terminal 420. To receive location data, FSP server 111 may send a request to customer device 120 and/or merchant system 131 for location data (step not shown). In some embodiments, customer device 120 and merchant system 131 may send location data to FSP server 111 automatically upon initiating an electronic transaction.

In step 540, FSP server 111 may determine whether customer 122's location is verified, based on received location data. An exemplary location verification process is described in further detail later.

If customer 122's location is not verified ("no" in step 540), FSP server 111 determines whether to retry verifying location in step 542. If FSP server 111 decides not to retry ("no" in step 542) when, for example, a predetermined number of retries have been attempted, the FSP server 111 may block the electronic transaction and deny the mobile payment in step 584, thereby ending process 500. Alternatively, FSP server 111 may retry verifying location ("yes" in step 542) to account for possible errors in the initial location data transmissions. To retry verifying location, process 500 returns to step 530.

Once the captcha is displayed on customer device 120 display 310 or an employee terminal 420 display 426, customer 122 may read the captcha characters aloud (step not shown). Customer device 120 may record customer 122's voice using microphone 370, and generate a time stamped voice sample. In some embodiments, employee terminal 420 may capture customer 122's voice using microphone 478, to generate the time stamped voice sample. Once generated, customer device 120 or employee terminal 420 may encrypt and transmit the voice sample to FSP server 111 (steps not shown in figures). In step 550, FSP server 111 receives and decrypts the voice sample.

FSP server 111 may process the voice sample to recognize spoken characters, using any known voice recognition method (step not shown). FSP server 111 may then compare recognized characters from the voice sample to the captcha characters, to determine whether customer 122 read the captcha properly (step not shown). If a predetermined percentage of the recognized voice sample characters match the captcha characters, FSP server 111 may proceed to compare customer 122's voice sample to one or more reference recordings in step 560. If a predetermined percentage of the recognized characters do not match the captcha characters, FSP server 111 may decide whether to block the electronic transaction, or retry steps 550-570 with a new captcha (step 580). The decision whether to retry may depend on whether customer 122 has already sent a predetermined number of voice samples for the current mobile payment. If the decision is made to retry, FSP server 111 may send a new captcha (step 582) and receive a new voice sample (repeating step 550). If FSP server 111 decides not to retry, the electronic transaction is blocked and the process ends in step 584.

In some embodiments, FSP server 111 may analyze the received voice sample regardless of the accuracy of the spoken characters. In such embodiments, FSP server 111 may give little weight to the recognized characters in the voice sample during the statistical analysis. Instead, FSP server 111 may focus the analysis on the similarity between the voice in the voice sample to the reference recording(s) stored for customer 122's FSP 110 account. In other embodiments, customer device 120 may instruct customer 122 to provide any voice sample, such as reading the SKU number of the product they are purchasing, or a description of the product. The voice sample may be processed to determine the voice similarity to stored reference recording, regardless of the content of the spoken words. However, by providing a captcha at the point of sale and comparing the spoken characters to the captcha, fraudulent transactions may be avoided by ensuring the voice sample is a new recording, and not a previous recording of customer 122's voice.

In step 560, FSP server 111 may compare customer 122's voice sample to one or more reference recordings. The one or more reference recordings may include one or more previously recordings of customer 122's voice, such as recordings of customer 122 speaking letters of the alphabet, numbers, words, phonetic sounds, or complete sentences. The one or more reference recordings may be accumulated and stored in FSP server 111 memory 240 or database 270, with reference recordings stored in association with some or all FSP 110 customers. To accumulate reference recordings, in some embodiments, FSP server 111 may request a reference recording from customer 122 during a new account setup process (step not shown). In other embodiments, FSP server 111 may request a reference recording for customer 122 at any time before using the mobile payment authentication methods disclosed herein.

In step 570, FSP server 111 may determine whether the voice sample sufficiently matches customer 122's voice stored in the reference recording(s) stored for customer 122's FSP 110 account. FSP server 111 may use any known voice recognition and sound waveform comparison methods for this determination. If the voice sample sufficiently matches the reference recording(s) ("yes" in step 570), then FSP server 111 may authorize the transaction, and complete the mobile payment in step 590, thereby ending process 500. A successful voice match ("yes" in step 570), combined with successful location verification ("yes" in step 540) indicates to FSP server 111 that customer 122 has been authenticated as having initiated the mobile payment, and customer 122 is located at the point-of-sale. These indicia authenticate to FSP 110 and customer 122 that the electronic transaction is genuine and properly authorized. Moreover, the step of reading a short string of characters is an efficient method for authenticating the mobile payment.

Returning to step 570, if customer 122's voice sample does not match the reference recording ("no" in step 570), FSP server 111 determines whether to retry in step 580. If FSP server 111 decides to retry ("yes" in step 580), FSP server 111 may send a new captcha for customer 122 to read with instructions to read aloud again in step 582, and the process returns to step 550.

If FSP server 111 decides not to retry ("no" in step 580), the electronic transaction may be blocked in step 584, thereby ending process 500. FSP server 111 may decide not to retry the voice sample steps if, for example, a predetermined number of consecutive retries were already attempted. As another example, FSP server 111 may decide not to retry when the voice sample is significantly different than the reference recording via statistical analysis of the waveforms. In some embodiments, FSP server 111 may lock customer 122's FSP 110 account due to suspected fraud when the voice sample is significantly different than the reference recording(s) (step not shown).

In some embodiments, process 500 steps may be performed partially or entirely by customer device 120 instead of FSP server 111. For example, FSP app(s) 352 on customer device 120 may operate in an "offline" mode, when a network 140 connection or direct connection to FSP server 111 is unavailable. In such embodiments, customer device 120 may store a reference recording for customer 122 in memory 340, and perform the voice sample comparison locally. Customer device 120 may also location data collected at the time of sale. Once customer device 120 reestablishes a connection to FSP server 111, the voice sample, location data, and data describing the electronic transaction may be encrypted and transmitted to FSP server 111. FSP server 111 may analyze the received data to ensure that the offline electronic transaction was authentic and properly authorized. This feature would allow customer 122 to continue conducting transactions with at least moderate levels of security when communication with FSP server 111 is not possible.

In some embodiments, customer 122 may initiate the electronic transaction while waiting in a checkout line at merchant 130's store. In such embodiments, customer 122 may initiate the electronic transaction using FSP app 352, and read a captcha received on customer device 120 from FSP server 111, to record a voice sample while waiting in line. Customer device 120 may encrypt and send the voice sample to FSP server 111. FSP server 111 may analyze the voice sample, and received location data to determine whether to authorize a pending electronic transaction. If the electronic transaction request is authentic, FSP server 111 may pre-authorize an electronic transaction. In this embodiment, customer 122 may approach employee terminal 420 with pre-authorization to immediately process the electronic transaction. At the time the electronic transaction is to be completed, FSP server 111 may request updated location data from customer device 120 and/or merchant system 131, to ensure that customer 122 is still within the same merchant 130 store. Pre-authorizations may expire after a predetermined period of time, such as five or ten minutes, if the electronic transaction is not completed. Furthermore, FSP server 111 may cancel the pre-authorization when customer 122 leaves the merchant 130 store without completing an electronic transaction.

Verifying Customer Location

FSP server 111 may verify customer 122's location during the authentication of a mobile payment using collected location data. To receive location data, FSP server 111 may request location data from customer device 120 upon initiation of the electronic transaction. In some embodiments, FSP server 111 may also request location data from merchant system 131. In other embodiments, FSP server 111 may determine the location of merchant system 30 by performing an Internet search for location data associated with merchant 130 stores. However, when merchant 130 is mobile, such as a mobile food truck or a traveling vendor, the merchant 130's location may change frequently. In such situations, FSP server 111 may request current location data directly from merchant system 131.

Location data may include time stamped coordinates such as, for example, GPS data, cellular triangulation data, or data for other known mobile device location methods. Customer device 120 may include a GPS receiver (not shown in figures) to collect GPS location data and transmit such data to FSP server 111 upon request, when sending a voice sample, and/or automatically upon initiation of the electronic transaction. Merchant system 131 employee terminal 420 may include hardware components for collecting location data. In some embodiments, merchant system 131 may store location data for the merchant's stores, and transmit stored location data upon request from FSP server 111, when sending a voice sample, and/or automatically upon initiation of the electronic transaction.

Once location data is received, FSP server 111 may analyze the time stamped location data. The location data may indicate the time at which customer device 120 and merchant system 131 were proximate to one another. Received location data may indicate the physical location of customer device 120 and merchant system 131 during or after the time that the voice sample was recorded. By analyzing location data, FSP server 111 may verify with certainty that customer device 120 is present at merchant 130's store, and interacting with merchant system 131.

Figure 6:
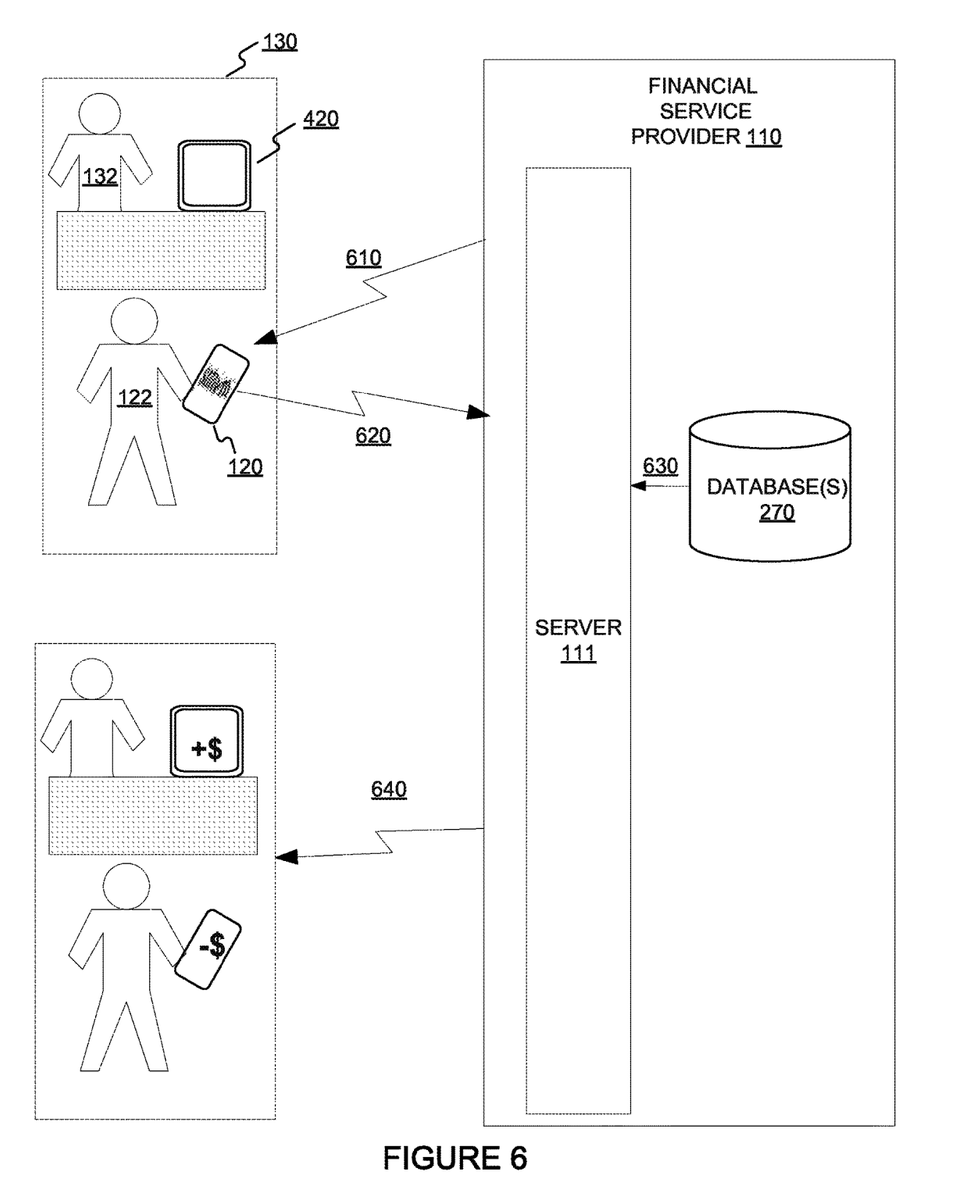
FIG. 6 is a diagram of an exemplary mobile electronic payment process, consistent with disclosed embodiments.

FIG. 6 shows a diagram of an exemplary mobile electronic payment process, consistent with disclosed embodiments. In step 610, customer device 120 may receive an encrypted captcha image from FSP server 111. Customer device 120 may decrypt and display the captcha image. Customer device 120 may then record customer 122's voice while speaking the captcha characters aloud, using customer device 120 microphone 370, and may generate a voice sample.

In step 620, customer device 120 may encrypt and transmit the voice sample to FSP server 111 for analysis. FSP server 111 may query database 270 for one or more reference recordings associated with customer 122's FSP 110 account in step 630, and compare the received voice sample to the one or more reference recordings stored in association with customer 122's FSP 110 account. If customer 122 holds a joint account with another FSP 110 customer, FSP server 111 may store reference recordings for each of the joint account holders, and compare the received voice sample against all of the joint account holder reference recordings. FSP server 111 may determine the voice sample to be authentic when the speaker in the voice sample is the same speaker in the reference recording(s), using known voice recognition and waveform comparison methods.

If FSP server 111 determines that the voice sample is authentic, in step 640 FSP server 111 may transmit information to customer device 120 and/or merchant system 131 of merchant 130, indicating that the mobile payment is authorized. Thereafter, FSP server 111 may deduct the amount requested for the electronic transaction from customer 122's FSP 110 account, and may transmit payment information to merchant system 131, or to an account associated with merchant system 131.

Figure 7:
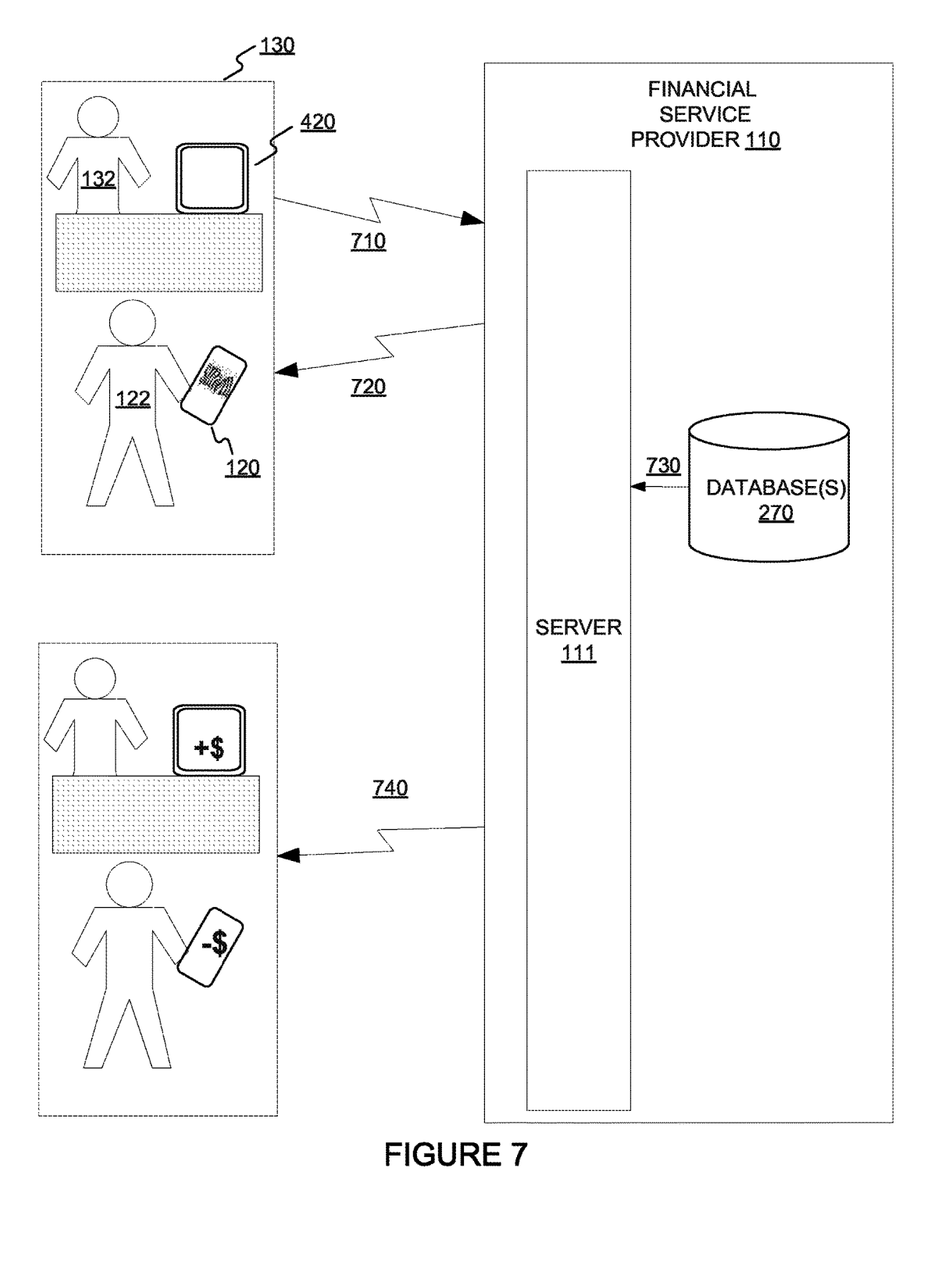
FIG. 7 is a diagram of another exemplary mobile electronic payment process, consistent with disclosed embodiments.

FIG. 7 shows a diagram of another exemplary mobile electronic payment process, consistent with disclosed embodiments. In step 710, customer device 120 may receive an encrypted captcha image from FSP server 111. Customer device 120 may decrypt and display the captcha image. Employee terminal 420 may then record customer 122's voice while speaking the captcha characters aloud, using microphone 428 (not shown in figure), and may generate a voice sample. By recording customer 122's voice using employee terminal 420, an extra layer of security is added, by further ensuring that customer 122 is present at the point-of-sale.

In step 720, employee terminal 420 may encrypt and transmit the voice sample to FSP server 111 for analysis. FSP server 111 may query database 270 for one or more reference recordings associated with customer 122's FSP 110 account in step 730, and compare the received voice sample to the one or more reference recordings stored in association with customer 122's FSP 110 account. If customer 122 holds a joint account with another FSP 110 customer, FSP server 111 may store reference recordings for each of the joint account holders, and compare the received voice sample against all of the joint account holder reference recordings. FSP server 111 may determine the voice sample to be authentic when the speaker in the voice sample is the same speaker in the reference recording(s), using known voice recognition and waveform comparison methods.

If FSP server 111 determines that the voice sample is authentic, in step 740 FSP server 111 may transmit information to customer device 120 and/or merchant system 131 of merchant 130, indicating that the mobile payment is authorized. Thereafter, FSP server 111 may deduct the amount requested for the electronic transaction from customer 122's FSP 110 account, and may transmit payment information to merchant system 131, or to an account associated with merchant system 131.

Figure 8:
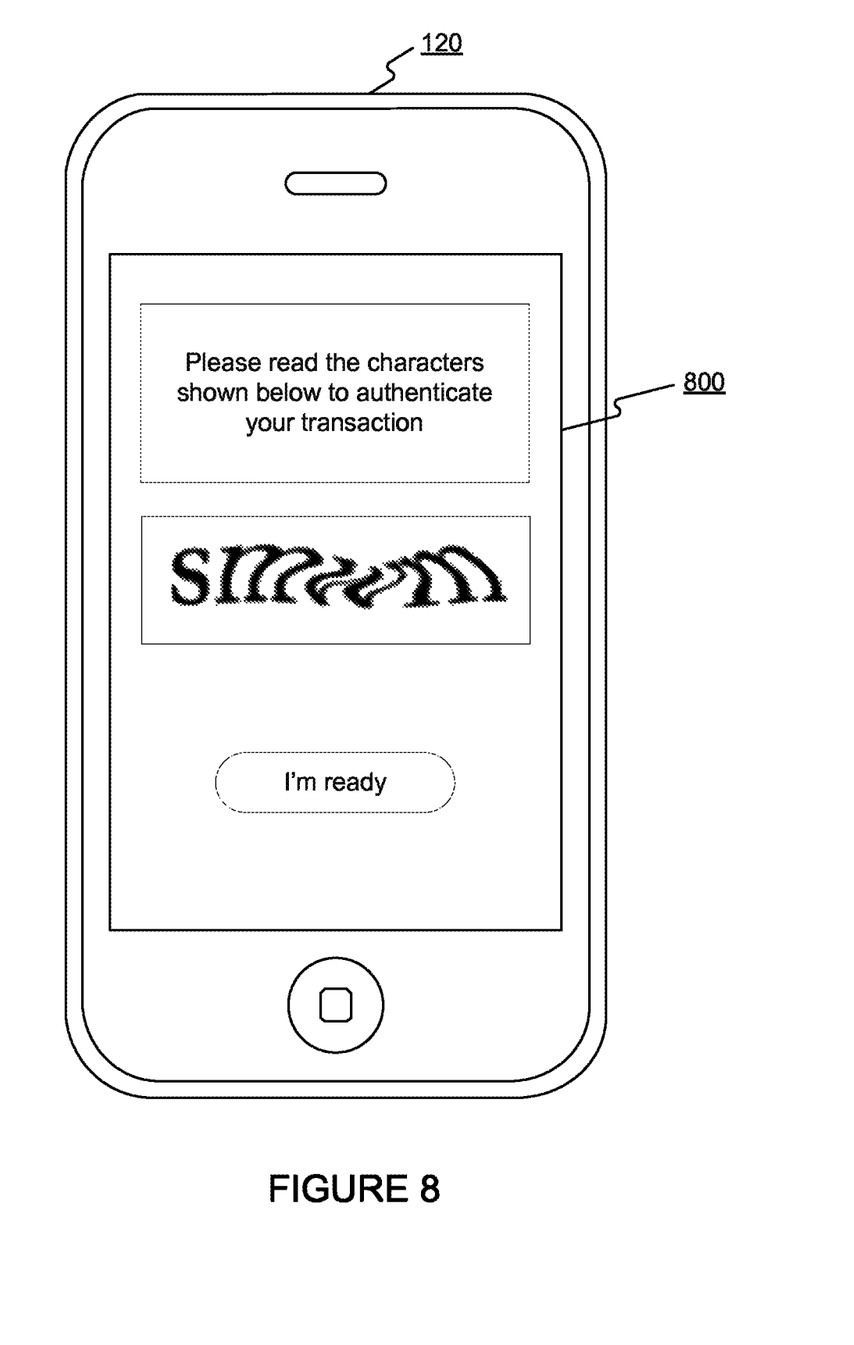
FIG. 8 is an exemplary user interface, consistent with disclosed embodiments.

FIG. 8 shows an exemplary user interface 800, consistent with disclosed embodiments. User interface 800 may correspond to the user interface generated on customer device 120 after step 620 in FIG. 6. As shown in FIG. 8, customer device 120 displays a captcha, and instructions for customer 122 to read the characters forming the captcha. Customer device 120 may also display a soft button for customer 122 to actuate once they are ready to create a voice sample.

In some embodiments, the captcha may be replaced with a picture of an object, with instructions for customer 122 to describe the object in a voice sample. In such embodiments, FSP server 111 may analyze the voice sample to compare the similarity in the speaker's voice to one or more reference recordings.

Those skilled in the relevant arts would recognize that the authentication methods and systems described herein could be used for purposes other than authorizing mobile payments. For example, the voice recognition authentication methods could be used in place of standard passwords for user account logins. As another example, voice recognition authentication may be used in place of security codes of PIN numbers for credit or debit card transactions performed over the Internet.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for authenticating an electronic payment at a point-of-sale location, comprising:
    a storage device configured to store instructions; and
    a processor configured to execute the stored instructions, the stored instructions causing the processor to:
        receive a request to conduct an electronic payment;
        transmit an image depicting content related to a product being purchased via the electronic payment to at least one of a mobile device or a terminal at the point-of-sale location;
        receive a location of the mobile device and a voice sample recorded at the point-of-sale location in response to the image;
        determine that the recorded voice sample matches the depicted content of the transmitted image;
        determine that the recorded voice sample is authentic by comparing the recorded voice sample to a reference recording without regard to spoken content of the recorded voice sample, the recorded voice sample being deemed authentic when a speaker in the recorded voice sample is determined to be the speaker in the reference recording;
        determine the mobile device is at the point-of-sale location by:
            comparing the received location to a location of the point-of-sale location; and
            comparing a time when the location of the mobile device was generated to a time when the voice sample was recorded; and
        authorize the electronic payment based on:
            the determination that the recorded voice sample is authentic;
            the determination that the recorded voice sample matches the depicted content of the transmitted image; and
            the determination that the mobile device is at the point-of-sale location.

2. The system of claim 1, wherein the request to conduct an electronic payment is received from one of a mobile device associated with a customer or a terminal computer associated with a merchant.

3. The system of claim 1, wherein the processor is included in a server operated by a financial service provider.

4. The system of claim 1, wherein the recorded voice sample is recorded using a mobile device operated by the speaker.

5. The system of claim 1, wherein the received voice sample comprises a spoken description of the transmitted image.

6. The system of claim 1, wherein comparing the received voice sample to the reference recording comprises performing a waveform comparison voice recognition method.

7. The system of claim 1, wherein the depicted content of the transmitted image comprises a serial number or Stock Keeping Unit (SKU) associated with the product being purchased via the electronic payment.

8. The system of claim 1, wherein the depicted content of the transmitted image comprises an image of the product being purchased via the electronic payment.

9. A computer-implemented method for authenticating an electronic payment at a point-of-sale location, comprising:
   receiving, by one or more processors, a request to conduct an electronic payment;
   transmitting, by the one or more processors, an image depicting content related to a product being purchased via the electronic payment to at least one of a mobile device or a terminal at the point-of-sale location;
   receiving, by the one or more processors, a location of the mobile device and a voice sample recorded at the point-of-sale location in response to the transmission of the image;
   determining, by the one or more processors, that the recorded voice sample matches the depicted content of the transmitted image;
   determining, by the one or more processors, that the recorded voice sample is authentic by comparing the recorded voice sample to a reference recording without regard to spoken content of the recorded voice sample, the recorded voice sample being deemed to be authentic when a speaker in the recorded voice sample is determined to be the speaker recorded in the reference recording;
   determining, by the one or more processors, that the mobile device is at the point-of-sale location by:
      comparing, by the one or more processors, the received location to a location of the point-of-sale location; and
      comparing, by the one or more processors, a time when the location of the mobile device was generated to a time when the voice sample was recorded; and
   authorizing, by the one or more processors, the electronic payment based on:
      the determination that the recorded voice sample is authentic;
      the determination that the recorded voice sample matches the depicted content of the transmitted image; and
      the determination that the mobile device is at the point-of-sale location.

10. The method of claim 9, wherein the request to conduct an electronic payment is received from one of a mobile device associated with a customer or a terminal computer associated with a merchant.

11. The method of claim 9, wherein the one or more processors are included in a server operated by a financial service provider.

12. The computer-implemented method of claim 9, wherein the received voice sample comprises a spoken description of the transmitted image.

13. The computer-implemented method of claim 9, wherein comparing the received voice sample to the reference recording comprises performing a waveform comparison voice recognition method.

14. The computer-implemented method of claim 9, wherein the depicted content of the transmitted image comprises a serial number or Stock Keeping Unit (SKU) associated with the product being purchased via the electronic payment.

15. The method of claim 9, wherein the recorded voice sample is recorded using a mobile device operated by the speaker.

16. A non-transitory computer-readable medium having stored instructions, which when executed, cause one or more processors to perform a mobile payment authentication method, comprising:
   receiving a request to conduct an electronic payment;
   transmitting an image depicting content related to a product being purchased via the electronic payment to at least one of a mobile device or a terminal at a point-of-sale location;
   receiving a location of the mobile device and a voice sample recorded at the point-of-sale location in response to the transmission of the image;
   determining that the recorded voice sample matches the depicted content of the transmitted image;
   determining the recorded voice sample is authentic by comparing the recorded voice sample to a reference recording without regard to spoken content of the recorded voice sample, the voice sample being deemed to be authentic when a speaker in the recorded voice sample is determined to be the speaker in the reference recording;
   determining the mobile device is at the point-of-sale location by:
      comparing the received location to a location of the point-of-sale location; and
      comparing a time when the location of the mobile device was generated to a time when the voice sample was recorded; and
   authorizing the electronic payment based on:
      the determination that the recorded voice sample is authentic;
      the determination that the recorded voice sample matches the depicted content of the transmitted image; and
      the determination that the mobile device is at the point-of-sale location.

17. The method of claim 16, wherein the request to conduct an electronic payment is received from one of a mobile device associated with a customer or a terminal computer associated with a merchant.

18. The method of claim 16, wherein the one or more processors are included in a server operated by a financial service provider.

19. The non-transitory computer-readable medium of claim 16, wherein the received voice sample comprises a spoken description of the transmitted image.

20. The non-transitory computer-readable medium of claim 16, wherein comparing the received voice sample to the reference recording comprises performing a waveform comparison voice recognition method.

* * * * *